United States Patent
Bozionek et al.

(10) Patent No.: US 8,885,622 B2
(45) Date of Patent: Nov. 11, 2014

(54) METHOD AND TERMINAL DEVICE FOR TRANSMITTING LOCATION INFORMATION IN INTERNET-ORIENTED NETWORKS

(75) Inventors: Bruno Bozionek, Borchen (DE); Karl Klaghofer, München (DE); Holger Prange, München (DE); Michael Tietsch, Kaufering (DE)

(73) Assignee: Siemens Enterprises Communications GmbH & Co. KG, Munich (DE)

( * ) Notice: Subject to any disclaimer, the term of this patent is extended or adjusted under 35 U.S.C. 154(b) by 178 days.

(21) Appl. No.: 13/119,031

(22) PCT Filed: Sep. 23, 2008

(86) PCT No.: PCT/EP2008/008053
§ 371 (c)(1),
(2), (4) Date: Apr. 14, 2011

(87) PCT Pub. No.: WO2010/034322
PCT Pub. Date: Apr. 1, 2010

(65) Prior Publication Data
US 2011/0206028 A1    Aug. 25, 2011

(51) Int. Cl.
*H04W 4/18* (2009.01)
*H04L 29/06* (2006.01)
*H04W 4/02* (2009.01)
*H04W 4/20* (2009.01)
*H04L 29/08* (2006.01)

(52) U.S. Cl.
CPC .......... *H04L 65/1096* (2013.01); *H04W 4/02* (2013.01); *H04W 4/18* (2013.01); *H04W 4/20* (2013.01); *H04L 65/1006* (2013.01); *H04L 67/18* (2013.01); *H04M 2242/30* (2013.01)
USPC ........................................ 370/338

(58) Field of Classification Search
None
See application file for complete search history.

(56) References Cited

U.S. PATENT DOCUMENTS

2003/0135581 A1* 7/2003 Phelan et al. ............. 709/217
2006/0129636 A1* 6/2006 Matsuura et al. .......... 709/203
(Continued)

FOREIGN PATENT DOCUMENTS

EP    1906638 A1    4/2008

OTHER PUBLICATIONS

European Patent: EP1906638A1, Shi.*
(Continued)

*Primary Examiner* — Hassan Phillips
*Assistant Examiner* — Omeed D Rahgozar
(74) *Attorney, Agent, or Firm* — Buchanan Ingersoll & Rooney PC

(57) ABSTRACT

A location information (li) which is available in a mobile terminal device (ME-T) and which indicates the geographical location of the terminal device (ME-T) is embedded in messages (m) of a SIP protocol (SIP) which are exchanged between the terminal device (ME-T) and the network (WLAN) during the establishment of a session and/or during a session and/or during the registration of a terminal device (ME-T) in the network (WLAN), e.g. LAN or UMTS, or during request of a service or a function. By advantageously complementing the SIP protocol (session initiation protocol), the location information can be transmitted from a mobile terminal device (ME-T), which optionally has a telephone function, to the network (WLAN) in any signaling state, thereby substantially reducing the economic outlay for implementing the transmission of location information (li) to the network (WLAN).

20 Claims, 1 Drawing Sheet

(56) References Cited

U.S. PATENT DOCUMENTS

2007/0076696 A1* 4/2007 An et al. .................. 370/352
2007/0112511 A1* 5/2007 Burfeind et al. ............ 701/213
2007/0242628 A1* 10/2007 Dutta et al. ................ 370/310

OTHER PUBLICATIONS

Providing Emergency Services in Internet Telephony, Shulzrinne et al.*
Written Opinion of the International Searching Authority for PCT/EP2008/008053 dated Apr. 3, 2009 (Form PCT/ISA/237) (English Translation).
International Preliminary Report on Patentability for PCT/EP2008/008053 dated Mar. 29, 2011 (Forms PCT/IB/373, PCT/ISA/237) (German Translation).
International Preliminary Report on Patentability for PCT/EP2008/008053 dated Mar. 29, 2011 (Forms PCT/IB/373, PCT/ISA/237) (English Translation).
Schulzrinne Columbia U H: "Emergency Services for Internet Telephony based on the Session Initiation Protocol (SIP); draft-schulzrinne-sipping-sos-03.txt" IETF Standard-Working-Draft, Internet Engineering Task Force, IETF, CH, Nr. 3, Dec. 6, 2002, XP015035066 ISSN: 0000-0004.
Henning Schulzrinne et al: "Providing Emergency Services in Internet Telephony" IEEE Internet Computing, IEEE Service Center, New York, NY, US, Jun. 1, 2002, Seiten 39-47, XP002308545 ISSN: 1089-7801.
International Search Report for PCT/EP2008/008053 dated Apr. 3, 2009 (Form PCT/ISA/210) (German Translation).
International Search Report for PCT/EP2008/008053 dated Apr. 3, 2009 (Form PCT/ISA/210) (English Translation).
Written Opinion of the International Searching Authority for for PCT/EP2008/008053 dated Apr. 3, 2009 (Form PCT/ISA/237) (German Translation).

* cited by examiner

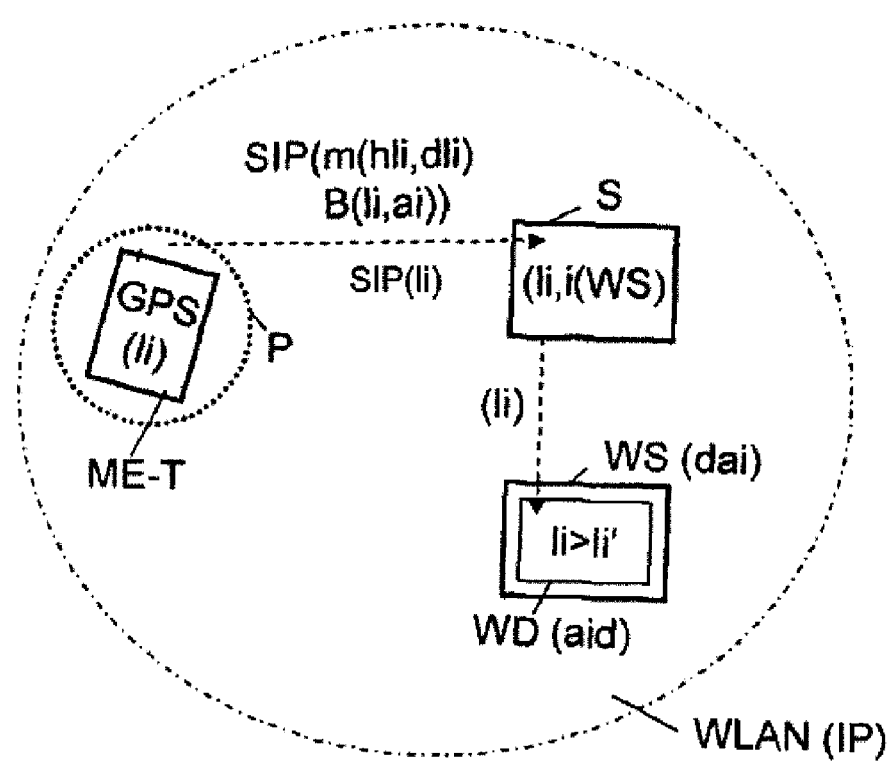

METHOD AND TERMINAL DEVICE FOR TRANSMITTING LOCATION INFORMATION IN INTERNET-ORIENTED NETWORKS

CROSS-REFERENCE TO RELATED APPLICATIONS

This application is the United States national phase under 35 U.S.C. §371 of PCT International Application No. PCT/EP2008/008053, filed on Sep. 23, 2008.

BACKGROUND OF THE INVENTION

1. Field of the Invention

Embodiments of the invention relate to methods and devices for transmitting and determining location information for wireless devices.

2. Background of the Related Art

In phone networks, the calling number of the terminal device initiating a communication link—known as the calling party number in the industry—is transmitted as identification to the network. In contrast to traditional phone networks, the location or local area of the terminal device—mobile terminal devices in particular—can no longer be determined in internet-protocol-based networks based on the calling party number.

Especially in mobile communication terminal devices, there are processes and components realized with which the exact or general location may be identified. For instance, many mobile terminal devices contain a GPS function (Global Positioning System) with which the position of the mobile terminal device may be identified, independent of the network. The information indicating the location of a terminal device is called "location information" in the industry.

BRIEF SUMMARY OF THE INVENTION

Embodiments of the invention relate to informing a network, for instance, based on the internet protocol about the geographical location of its communication terminal devices.

An important aspect of the method according to the invention is that location information available in the terminal device and indicating the location of the terminal device is embedded in messages of a SIP protocol (Session Initial Protocol),
- which during the establishment of a session or
- during a session between terminal and network or
- during registration of a terminal device in the network (or
- upon prompting by a service or function are being exchanged.

An important advantage of embodiments of the invention is that by adding the SIP protocol, the location information can be transmitted from a mobile or hard-wired terminal device to the network during the initialization phase of a session and also during a session. This allows a reduction of costs for implementing transmission of location information to the network; for instance, because implementing an additional protocol for the transmission of the location information is not necessary.

According to embodiments of the invention, location information may also be transmitted outside of a session from the terminal device to the network, i.e., without a conversation or information transmission taking place at the same time. Therefore, the network also knows the location information in situations where no session from the terminal device is in progress, and may use it for different applications.

The FIGURE below shows the invention and its advantageous developments in detail.

BRIEF DESCRIPTION OF THE FIGURE

The single FIG. 1, for instance, shows a schematic drawing of an example of one of several possible terminal devices ME with a telephone function T-called ME-T in the following, which, for example, is subscribed to a wireless network—e.g. a wireless, local network WLAN. The procedure according to the invention is also advantageous in other hard-wired networks, e.g., local networks or it may be used in other wireless networks like UMTS—not shown.

DETAILED DESCRIPTION OF THE INVENTION

The mobile terminal device ME-T has a function with which it can identify or determine its geographical position P or its local geographic area P. The geographical position P of the terminal device ME-T can for instance be determined by a GPS function GPS-GPS receiver and appropriate programs—implemented within the terminal device ME-T, indicated in the drawing as GPS. Alternatively, the local geographical area P can be determined by a function in a terminal device ME-T, which calculates the local area P based on the strengths and direction of reception of the radio signals of multiple radio areas of the radio stations—not shown. Information indicating the local geographical area P or the geographical position P is called location information in the industry. The location information can, for instance, also be indicated with coordinates of the Cartesian Coordinate System, also called geolocation, or with so-called civic address information, e.g. postal information like mailing addresses—city, street, house number, zip code—or other geophysical information.

For the exemplary embodiment, it is assumed that the wireless network WLAN is operated according to the internet protocol IP, wherein the mobile terminal device ME-T is turned off as the IP terminal device—indicated as WLAN (IP) in the FIGURE. For signaling the phone or voice connections of the mobile terminal device ME-T to other mobile terminal devices—not shown—a SIP protocol SIP is advantageously provided and indicated as SIP on the FIGURE. An SIP protocol SIP is currently specified in the RFC standard 3261 and is provided especially for internet telephony or for terminal devices with transmission functions of voice information or multimedia information.

According to embodiments of the invention, the location information li is transmitted by the SIP protocol SIP from the mobile terminal device ME-T to the wireless network WLAN. For the embodiment, it is assumed that the location information li is transmitted wirelessly to a server S in the wireless network WLAN and stored there—indicated with an arrow labeled SIP (li) or SIP(m(hli, dli), B(li,ai)) in the FIGURE. The SIP protocol can manage multiple sessions with one or more mobile terminal devices ME-T, allowing sessions not only for voice or telephony but any sessions with transmission of multimedia streams for conferences, for example, or other terminal devices like PC.

Within the SIP protocol SIP there are several messages m specified that are transmitted during the initialization of a session between two mobile terminal devices ME-T or during a session from the mobile terminal device ME-T to the wireless network WLAN or vice versa.

According to the current SIP standard, the INVITE message is provided for the initialization of a session and the NOTIFY, UPDATE; and PUBLISH messages are provided during a session. For initiating subscription of a mobile terminal device ME-T in a network, a SUBSCRIBE message is provided and for initiating a registration of a mobile terminal device ME-T in the network a REGISTER message is provided. According to the invention, location information li can be transmitted in all these messages m.

A SIP message m is generally formed by a header H and a user agent, wherein the user agent of the SIP standard SIP is called Body B. This term shall be used in the following. The embodiment assumes that the header H is expanded by an indicator hli that the transmission of location information li is supported and location information li is contained within the body B.

An INVITE message of the SIP protocol shows an example of how a header SIPH and body B can be designed for the transmission of location information li.

Header:
INVITE sip:1002@10.26.12.102:5060; transport=udp SIP/2.0
1)
From: Bob <sip:49897221001@10.26.12.102>; tag=5f6205144a23d
2)
To:sip:1002@10.26.100.102
3)
Via:SIP/2.0/UDP10.26.12.103:5060;
branch=z9hG4bKd143e9ba3
4)
Call-ID: 9e9cf76b830011e
5)
CSeq: 1 INVITE
6)
Max-Forwards: 70
7)
Content-Length:239
8)
Supported: locationMap
9)
Allow: INVITE, ACK, CANCEL, BYE, REFER, NOTIFY, MESSAGE, UPDATE
10)
Content-Type: application/location
11)
Contact: Bob <sip:49897221001@10.26.100.23:5060; transport=udp>
12)
Excerpt of body B:
<location>
13)
<locationServer>
http://www.server.enterprise.com/
14)
get<locationServer>
<x-location>364.938</x-location>
15)
<y-location>57.9834</y-location>
16)
<z-location>578.0</z-location>
17)
</location>
18)
Explanations:
1) Message type, target address (URI), SIP version
2) URI (Universal Address Information) of a terminal device being called (i.e., the telephone number of the terminal device being called)
3) Display name of the calling terminal device and its URI
4) IP address, port number and the transport protocol for the response to the message
5) Random character string as unique number for a communication relationship
6) Sequence number (relating to message type)
7) Maximum number of proxy servers (decreasing with each passed proxy)
8) Length of body
9) Indicator hli in the header SIPH, that the transmission of location information li is supported.
10) Permitted messages m
11) Data type (dli) in the body (according to the invention an application for the transmission of location information li)
12) SIP address of the terminal device ME-T for direct communication
13) Beginning of the location information li
14) Name of the WEB server WS, to which the location information li is to be transmitted by server S
15) x-coordinate value of the Cartesian Coordinate System
16) y-coordinate value of the Cartesian Coordinate System
17) z-coordinate value of the Cartesian Coordinate System
18) End of the location information li The configuration of the header H in the other SIP messages m is handled basically according to the example shown. The location information li in the body B of an SIP message m can have varying forms.

In a first variation shown in the exemplary embodiment for a body B, address information ai of a WEB server WS specifies which the location information li is to be transmitted. In this WEB Server WS, a WEB Service WD has been implemented with the address information aid, with which the location information li can be processed in different ways and provided in WEB format to the terminal devices ME or to applications. Also indicated are the x and y-coordinates of a Cartesian Coordinate System, which can be provided by a GPS function GPS, as previously described. Optionally, as long as this information is available in the terminal device, the z-coordinate value of a Cartesian Coordinate System is also indicated—e.g., height above sea level. In this variation, location information li is transmitted together with address information ai to the server S. The latter recognizes that the location information li is to be passed on to the addressed WEB server WS via the wireless network WLAN—indicated with an arrow in the FIGURE.

In the WEB server WS it is possible to make location information li available, using an implemented WEB Service WD, e.g., to be processed, stored, and available for different applications for display in WEB format. The processing can, for instance, be handled in such a way where the location information li is inserted as geographical information in a map and then is transmitted in WEB format to a mobile terminal device ME or an application in the network WLAN—not shown—for display or processing there. Other processing for uses in applications, for example, can be implemented advantageously with other services in the WEB server WS or other servers—not shown—or other components of the wireless network WLAN. Examples for processing are forms of representation, e.g., 3D representation of buildings/landscapes, 2D representation of map materials/overview maps or simply spreadsheet processing.

Another variation—not shown—is transmitting the location information li to the server S only as x, y and z-coordinate values of the Cartesian Coordinate System inserted into the body B and stored there. The stored location information li can then be made available to or be accessed by different terminal devices ME and applications.

Another variation is transmitting the location information li plus download address information with which the processed location information li' can be downloaded to mobile terminal devices or applications. The download address information dai could be the network address, for example, of the WEB server WS, from where the location information li', after appropriate processing, can be downloaded to the respective mobile terminal devices ME or applications.

The location information li can also be indicated in different ways within the body B. First of all, it can be indicated with x and y and optional z-coordinate values of the Cartesian Coordinate System but secondly also in form of postal information or different geophysical information or input. The type of input in this case depends on what type of location information li the function can provide for determining the local geographical area P in the mobile terminal device ME-T. An expanded range GPS function GPS, for instance, can also provide postal information like the names of cities, streets or buildings or companies. Another type of geophysical information is the input of a local area, from which one geographical area is selected based on an alphanumeric value from several specified local areas in a larger geographical area.

The invention claimed is:

1. A method of transmitting location information within a network having a first server and a second server comprising:
   a first terminal device determining a geographical location of the first terminal device;
   the first terminal device determining location information based on the determined geographical location of the terminal device;
   the first terminal device forming a message having a header and a body, the header having a location information identifier identifying a presence of the location information within the body and a data type identifier identifying a data type of the location information, the body having the location information and address information, the address information identifying the second server as an intended recipient of the location information;
   the first terminal device sending the message to the first server;
   in response to receiving the message, the first server determining the location information is intended for the second server based on the address information of the message and subsequently sending the location information to the second server;
   the second server receiving the location information from the first server and subsequently processing the location information to alter a format of the location information so that the processed location information is in a format capable of being processed by a second terminal device and subsequently transmitting the processed location information to the second terminal device;
   the second terminal device receiving the processed location information transmitted by the second server;
   the second terminal device displaying the geographical location of the first terminal device as a representation based on the received processed location information transmitted by the second server, the representation having at least two dimensions for illustrating the geographical location of the first terminal device.

2. The method of claim 1 wherein the processed location information transmitted to the second terminal device identifies an address at which the location information is downloadable from the second server.

3. The method of claim 1 wherein the processed location information identifies a postal address of the geographical location.

4. The method of claim 1 wherein the processed location information is a network address of the first terminal device.

5. The method of claim 1 wherein the first terminal device is a mobile terminal device and the second terminal device is a mobile terminal device.

6. The method of claim 1 wherein the network is a wireless network.

7. The method of claim 1 wherein the first terminal device has a telephone function.

8. The method of claim 1 wherein the message is created in accordance with Session Initiation Protocol.

9. The method of claim 1 wherein the second server has a location information aid for processing the location information so that the processed location information is suitable for display by the second terminal device.

10. The method of claim 1 wherein the second server has a location information aid for processing the location information so that the processed location information is suitable for display by the second terminal device such that the processed location information represents the location information via a two dimensional representation of the geographical location.

11. The method of claim 1 wherein the location information is comprised of an x-coordinate value, a y-coordinate value, and a z-coordinate value for identifying the geographical location.

12. The method of claim 1 wherein the location information is comprised of an x-coordinate value and a y-coordinate value for identifying the geographical location.

13. The method of claim 1 wherein the second server processing of the location information is comprised of inserting geographical location information identified by the location information into a map that is transmittable in a format for processing by the second terminal device for display of the map having the inserted geographical location information via the second terminal device; and
   wherein the second terminal device displaying the geographical location of the first terminal device by displaying a map based on the processed location information received from the second server.

14. The method of claim 1 wherein the message is formed by the first terminal device to establish a communication session or to establish a session between the network and the first terminal device.

15. The method of claim 1 wherein the message is formed to register the first terminal device with the network.

16. The method of claim 1 wherein the message is formed by the first terminal device in response to the first terminal device receiving a prompt from a service communicating with the first terminal device.

17. The method of claim 1 wherein the message is formed during establishment of a communication session between the first terminal device and the second terminal device.

18. The method of claim 1 wherein the message is formed during a communication session between the first and second terminal devices.

19. The method of claim 1 wherein the message is formed during registration of the first terminal device with the network.

20. The method of claim 1 wherein the message is formed and sent by the first terminal device in response to prompting by an element of the network.

* * * * *